(12) United States Patent
Singh et al.

(10) Patent No.: US 9,563,938 B2
(45) Date of Patent: Feb. 7, 2017

(54) SYSTEM AND METHOD FOR REMOVING IMAGE NOISE

(71) Applicant: ANALOG DEVICES TECHNOLOGY, Hamilton (BM)

(72) Inventors: Raka Singh, Bangalore (IN); Rajesh Mahapatra, Bangalore (IN); Gaurav Malik, Bangalore (IN)

(73) Assignee: Analog Devices Global, Hamilton (BM)

(*) Notice: Subject to any disclaimer, the term of this patent is extended or adjusted under 35 U.S.C. 154(b) by 258 days.

(21) Appl. No.: 14/269,979

(22) Filed: May 5, 2014

(65) Prior Publication Data

US 2014/0241636 A1 Aug. 28, 2014

Related U.S. Application Data

(63) Continuation of application No. 12/950,664, filed on Nov. 19, 2010, now Pat. No. 8,755,625.

(51) Int. Cl.
| | |
|---|---|
| *G06T 5/00* | (2006.01) |
| *H04N 1/58* | (2006.01) |
| *H04N 1/409* | (2006.01) |
| *H04N 9/64* | (2006.01) |
| *G06K 9/40* | (2006.01) |
| *G06T 5/30* | (2006.01) |

(52) U.S. Cl.
CPC .............. *G06T 5/002* (2013.01); *G06K 9/40* (2013.01); *G06T 5/30* (2013.01); *H04N 1/409* (2013.01); *H04N 1/58* (2013.01); *H04N 9/646* (2013.01); *G06T 2207/20032* (2013.01); *G06T 2207/20192* (2013.01)

(58) Field of Classification Search
CPC .............. H04N 19/00909; H04N 9/646; H04N 19/00157; H04N 19/00315; H04N 19/00303; H04N 5/208; H04N 1/409; H04N 1/4092; H04N 1/58; H04N 7/26377

See application file for complete search history.

(56) References Cited

U.S. PATENT DOCUMENTS

| | | |
|---|---|---|
| 5,331,442 A | 7/1994 | Sorimachi |
| 5,561,723 A | 10/1996 | DesJardins et al. |
| 5,661,823 A | 8/1997 | Yamauchi et al. |

(Continued)

FOREIGN PATENT DOCUMENTS

| | | |
|---|---|---|
| EP | 1150248 | 10/2001 |
| KR | 10-0872253 | 12/2008 |

(Continued)

OTHER PUBLICATIONS

Final Office Action for U.S. Appl. No. 12/950,671 mailed Oct. 24, 2014, 16 pages.

(Continued)

*Primary Examiner* — Manav Seth
(74) *Attorney, Agent, or Firm* — Patent Capital Group

(57) ABSTRACT

A system and method for removing noise from images are disclosed herein. An exemplary system includes an edge-detection-based adaptive filter that identifies edge pixels and non-edge pixels in an image and selects a filtering technique for at least one non-edge pixel based on a comparison of the at least one non-edge pixel to a neighboring pixel region, wherein such comparison indicates whether the at least one non-edge pixel is a result of low-light noise.

22 Claims, 7 Drawing Sheets

(56) References Cited

U.S. PATENT DOCUMENTS

| | | | |
|---|---|---|---|
| 5,768,440 | A | 6/1998 | Campanelli et al. |
| 5,771,318 | A | 6/1998 | Fang et al. |
| 5,793,885 | A | 8/1998 | Kasson |
| 5,959,693 | A | 9/1999 | Wu et al. |
| 6,148,103 | A | 11/2000 | Nenonen |
| 6,167,164 | A | 12/2000 | Lee |
| 6,229,578 | B1 | 5/2001 | Acharya et al. |
| 6,259,489 | B1 | 7/2001 | Flannaghan et al. |
| 6,272,497 | B1 | 8/2001 | Mendenhall et al. |
| 6,389,176 | B1 | 5/2002 | Hsu et al. |
| 6,452,639 | B1 | 9/2002 | Wagner et al. |
| 6,608,910 | B1 | 8/2003 | Srinivasa et al. |
| 6,614,474 | B1 | 9/2003 | Malkin et al. |
| 6,621,595 | B1 | 9/2003 | Fan et al. |
| 6,668,097 | B1 * | 12/2003 | Hu .................. G06T 5/001 375/E7.19 |
| 6,721,458 | B1 | 4/2004 | Ancin |
| 6,784,944 | B2 * | 8/2004 | Zhang .............. H04N 9/646 348/607 |
| 6,798,910 | B1 | 9/2004 | Wilson |
| 6,928,196 | B1 | 8/2005 | Bradley et al. |
| 6,965,395 | B1 | 11/2005 | Neter |
| 7,142,729 | B2 | 11/2006 | Wredenhagen et al. |
| 7,151,863 | B1 | 12/2006 | Bradley et al. |
| 7,155,058 | B2 | 12/2006 | Gaubatz et al. |
| 7,167,595 | B2 | 1/2007 | Hiroshige et al. |
| 7,170,529 | B2 | 1/2007 | Chang |
| 7,313,288 | B2 | 12/2007 | Dierickx |
| 7,336,821 | B2 * | 2/2008 | Ciuc ................. G06K 9/0061 382/167 |
| 7,362,911 | B1 * | 4/2008 | Frank ................ H04N 5/365 348/E5.081 |
| 7,397,964 | B2 | 7/2008 | Brunner et al. |
| 7,471,320 | B2 | 12/2008 | Malkin et al. |
| 7,627,192 | B2 | 12/2009 | Yokochi |
| 7,724,307 | B2 | 5/2010 | Wan et al. |
| RE41,402 | E * | 6/2010 | Kim .................. G06T 5/20 358/3.26 |
| 7,860,337 | B2 | 12/2010 | Zimmer |
| 7,868,950 | B1 | 1/2011 | Samadani et al. |
| 7,876,972 | B2 * | 1/2011 | Bosco ................ G06T 5/20 382/260 |
| 8,009,210 | B2 * | 8/2011 | Matsushima ....... H04N 5/217 348/241 |
| 8,149,336 | B2 | 4/2012 | Mohanty et al. |
| 8,189,943 | B2 | 5/2012 | Yea et al. |
| 8,290,061 | B2 | 10/2012 | Sang et al. |
| 8,457,433 | B2 | 6/2013 | Hong |
| 8,488,031 | B2 | 7/2013 | Schwartz et al. |
| 8,699,813 | B2 * | 4/2014 | Singh ................ H04N 5/213 382/256 |
| 8,755,625 | B2 | 6/2014 | Singh et al. |
| 2001/0012397 | A1 | 8/2001 | Kato |
| 2002/0159650 | A1 | 10/2002 | Hiroshige et al. |
| 2002/0181024 | A1 | 12/2002 | Morimoto et al. |
| 2003/0048951 | A1 | 3/2003 | Rengakuji et al. |
| 2003/0185463 | A1 | 10/2003 | Wredenhagen et al. |
| 2003/0189655 | A1 | 10/2003 | Lim et al. |
| 2003/0190092 | A1 | 10/2003 | Dyas et al. |
| 2005/0013363 | A1 | 1/2005 | Cho et al. |
| 2005/0036062 | A1 | 2/2005 | Kang et al. |
| 2005/0276505 | A1 | 12/2005 | Raveendran |
| 2006/0023794 | A1 | 2/2006 | Wan et al. |
| 2006/0039590 | A1 | 2/2006 | Lachine et al. |
| 2006/0110062 | A1 | 5/2006 | Chiang et al. |
| 2006/0146193 | A1 | 7/2006 | Weerasinghe et al. |
| 2006/0181643 | A1 | 8/2006 | De Haan |
| 2006/0232709 | A1 | 10/2006 | Renner et al. |
| 2006/0294171 | A1 | 12/2006 | Bossen et al. |
| 2007/0040914 | A1 | 2/2007 | Katagiri et al. |
| 2007/0091187 | A1 | 4/2007 | Lin |
| 2007/0140354 | A1 | 6/2007 | Sun |
| 2007/0183684 | A1 | 8/2007 | Bhattacharjua |
| 2008/0085061 | A1 | 4/2008 | Arici et al. |
| 2008/0088719 | A1 | 4/2008 | Jacob |
| 2008/0112640 | A1 | 5/2008 | Park et al. |
| 2008/0123979 | A1 | 5/2008 | Schoner |
| 2008/0199099 | A1 | 8/2008 | Michel et al. |
| 2008/0205786 | A1 | 8/2008 | Young |
| 2008/0239153 | A1 | 10/2008 | Chiu |
| 2008/0240602 | A1 | 10/2008 | Adams |
| 2008/0317377 | A1 | 12/2008 | Saigo et al. |
| 2009/0016603 | A1 | 1/2009 | Rossato et al. |
| 2009/0033773 | A1 | 2/2009 | Kinoshita |
| 2009/0129695 | A1 | 5/2009 | Aldrich |
| 2009/0147111 | A1 | 6/2009 | Litvinov |
| 2009/0154800 | A1 | 6/2009 | Kojima et al. |
| 2009/0175535 | A1 | 7/2009 | Mattox |
| 2009/0208106 | A1 | 8/2009 | Dunlop et al. |
| 2009/0219379 | A1 | 9/2009 | Rossato et al. |
| 2009/0278961 | A1 | 11/2009 | Mohanty |
| 2009/0290067 | A1 | 11/2009 | Ishiga |
| 2010/0020208 | A1 | 1/2010 | Barbu |
| 2010/0021075 | A1 | 1/2010 | Majewicz |
| 2010/0142843 | A1 | 6/2010 | Chen |
| 2010/0182968 | A1 | 7/2010 | Ojala et al. |
| 2011/0090351 | A1 | 4/2011 | Cote et al. |
| 2011/0090370 | A1 | 4/2011 | Cote et al. |
| 2011/0317045 | A1 | 12/2011 | Vakrat et al. |
| 2012/0127370 | A1 | 5/2012 | Singh et al. |
| 2012/0128243 | A1 | 5/2012 | Singh et al. |
| 2012/0128244 | A1 | 5/2012 | Singh et al. |
| 2012/0154596 | A1 | 6/2012 | Wajs |

FOREIGN PATENT DOCUMENTS

| | | |
|---|---|---|
| KR | 10-1537295 | 7/2015 |
| WO | 2005065115 | 7/2005 |

OTHER PUBLICATIONS

R. Jha and M. E. Jernigan "Edge adaptive filtering: How much and which direction?", Proceedings of the IEEE International Conference on Systems, Man and Cybernetics, pp. 364 -366 1989.

H. Adelmann, "An edge-sensitive noise reduction algorithm for image processing", Computers in Biology and Medicine 29, 1999, p. 137-145.

R. Wallis, "An approach to the space variant restoration and enhancement of images", Proceedings, Symposium on Current Mathematical Problems in Image Science, 1976, p. 107-111.

J. Lee, "Refined Filtering of Image Noise Using Local Statistics", Computer Graphics and Image Processing 15, 1981, p. 380-389.

Translation of Korean Office Action for KR Patent Application Serial No. 2013-7015695 mailed Oct. 13, 2014, 4 pages.

Translation of Response to Korean Office Action for KR Patent Application Serial No. 2013-7015695 filed Dec. 15, 2014, 8 pages.

Translation of Notice of Allowance in Korean Patent Application Serial No. 2013-7015695 mailed Apr. 13, 2015, 1 pages.

Office Action issued in Chinese Patent Application Serial No. 201180062954.X mailed Sep. 30, 2015, 8 pages.

Non-Final Office Action for U.S. Appl. No. 12/950,664 mailed Dec. 7, 2012.

Response to Non-Final Office Action for U.S. Appl. No. 12/950,664 filed Jun. 7, 2013.

Non-Final Office Action for U.S. Appl. No. 12/950,664 mailed Sep. 6, 2013.

Response to Non-Final Office Action for U.S. Appl. No. 12/950,664 filed Dec. 6, 2013.

Notice of Allowance for U.S. Appl. No. 12/950,664 mailed Feb. 3, 2014.

Non-Final Office Action for U.S. Appl. No. 12/950,666 mailed Dec. 26, 2012.

Response to Non-Final Office Action for U.S. Appl. No. 12/950,666 filed Apr. 26, 2013.

Notice of Allowance for U.S. Appl. No. 12/950,666 mailed Aug. 5, 2013.

Non-Final Office Action for U.S. Appl. No. 12/950,671 mailed Mar. 21, 2013.

(56) References Cited

OTHER PUBLICATIONS

Response to Non-Final Office Action for U.S. Appl. No. 12/950,671 filed Jun. 20, 2013.
Final Office Action for U.S. Appl. No. 12/950,671 mailed Aug. 26, 2013.
Non-Final Office Action for U.S. Appl. No. 12/950,671 mailed Mar. 27, 2014.
International Search Report and Written Opinion mailed on Jun. 11, 2012 for International Application No. PCT/US2011/060756.
Kinabalu, Kota, "Impulse Detection Adaptive Fuzzy (IDAF) Filter," http://www.computer.org/portal/web/scd1/doi/10.1109/ICCTD.2009.157.
Justin Reschke, "Parallel Computing", Sep. 14, 2004, http://www.cs.ucf.edu/courses/cot4810/fal104/presentations/Parallel_Computing.ppt, p. 1-28.
Blaise, Barney, "Introduction to Parallel Computing", May 27, 2010, http://web.archive.org/web/20100527181410/http://computing.llnl.gov/tutorials/parallel_comp/, p. 1-34.
"Introduction to Parallel Programming", Jun. 27, 2010, http://web.archive.org/web20100627070018/http://static.msi.umn.edu/tutorial/scicomp/general/intro_parallel_prog/content.html, p. 1-12.
"Introduction to Parallel Programming Concepts", date unknown, http://rcc.its.psu/education/workshops/pages/parwork/introctiontoParallelProgrammingConcepts.pdf, p. 1-124.
Examination Report issued in EP Patent Application Serial No. 11799339.4 mailed Jan. 5, 2016, 6 pages.
Reasons from the Summons to Attend Oral Proceedings issued in EP Patent Application Serial No. 11799339.4 mailed Sep. 21, 2016, 3 pages.

\* cited by examiner

SYSTEM AND METHOD FOR REMOVING IMAGE NOISE

PRIORITY DATA

This application is a continuation application of U.S. patent application Ser. No. 12/950,664 entitled "COMPONENT FILTERING FOR LOW-LIGHT NOISE REDUCTION" filed Nov. 19, 2010, which is hereby incorporated by reference in its entirety.

TECHNICAL FIELD

The present disclosure generally relates to video signal processing, and in particular to processing video signals to remove artifacts caused by low-light noise.

BACKGROUND

Low-light images are especially susceptible to corruption from noise caused by light-detecting sensors (i.e., low-light artifacts). For example, a video or still camera may capture undesirable grains or discolorations in low-light conditions. This noise may lead to uncorrelated pixels and, as a result, reduced compression efficiency for video coding algorithms (e.g., MPEG4 and H.264). Many applications, such as security cameras, capture low-light images and require a large amount of storage space for retaining those images, and any decrease in the required storage space may lead to a more cost-effective application, an increase in the number of images or frames of video stored, or reduced network traffic for transporting the images. Thus, efforts have been made to detect and eliminate low-light noise.

Previous efforts (such as transform-domain methods, DCT, wavelet, or other statistical methods), however, suffer from drawbacks. These methods are computationally intensive and require a significant amount of computing resources, which may not be available on low-power, portable, or other devices. Furthermore, these methods are not adjustable based on available resources or the complexity of the source image, further wasting resources on simple images or during high-load conditions in which the additional resources may not be necessary or available.

OVERVIEW OF EXAMPLE EMBODIMENTS

Various systems, methods, and non-transitory media for removing noise from an image are disclosed herein. An exemplary system includes an edge-detection-based adaptive filter that identifies edge pixels and non-edge pixels in the image and selects a filtering technique for at least one non-edge pixel based on a comparison of the at least one non-edge pixel to a neighboring pixel region, wherein such comparison indicates whether the at least one non-edge pixel is a result of low-light noise. The edge-detection-based adaptive filter can include an edge-difference filter that divides pixels of the image into the edge pixels and the non-edge pixels and/or a dilation-based filter that expands a region of edge pixels to include non-edge pixels. In various implementations, the edge-detection-based adaptive filter includes a dilation-based filter for modifying an output of the edge-difference filter by distributing results of edge detection to neighboring pixels.

In various implementations, the system can further include a Gaussian distribution engine that computes a mean and a variance of the Gaussian distribution of the neighboring pixel region. The Gaussian distribution engine can compare the at least one non-edge pixel to the neighboring pixel region by determining a difference between a value of the at least one non-edge pixel and the mean of the neighboring pixel region, and selecting the filtering technique based on a comparison of the difference and the variance of the neighboring pixel region. In various implementations, the system further includes a median-filter that determines a median value for the neighboring pixel region and replaces an original value of the at least one non-edge pixel with the median value when the comparison is greater than a first threshold; and a low-pass filter that determines a low-pass filter value for the neighboring pixel region and replaces the original value of the at least one non-edge pixel with the low-pass filter value when the comparison is less than the first threshold and greater than a second threshold. The edge-detection-based adaptive filter can output the low-pass filter value, the median value, or the original value.

An exemplary method includes identifying edge pixels and non-edge pixels in the image; and selecting a filtering technique for at least one non-edge pixel based on a comparison of the at least one non-edge pixel to a neighboring pixel region, wherein such comparison indicates whether the at least one non-edge pixel is a result of low-light noise. Identifying the edge pixels and non-edge pixels can include expanding a region of edge pixels to include non-edge pixels.

In various implementations, selecting the filtering technique includes determining a mean of the neighboring pixel region; determining a variance of the neighboring pixel region; determining a difference between an original value of the at least one non-edge pixel and the mean of the neighboring pixel region; and determining an assigned value of the at least one non-edge pixel based on a comparison of the difference and the variance of the neighboring pixel region. Determining the assigned value of the at least one non-edge pixel can include when the comparison is greater than a first threshold, determining a median value for the neighboring pixel region and assigning the at least one non-edge pixel with the median value; when the comparison is less than the first threshold and greater than a second threshold, determining a low-pass filter value for the neighboring pixel region and assigning the at least one non-edge pixel with the low-pass filter value; and when the comparison is less than the second threshold, assigning the at least one non-edge pixel the original value. In various implementations, determining the mean and the variance can include determining a mean and a variance of a Gaussian distribution of the neighboring pixel region. In various implementations, the method further includes determining a median value for the neighboring pixel region and replacing the at least one non-edge pixel with the median value when the comparison is greater than the first threshold; and determining a low-pass filter value for the neighboring pixel region and replacing the at least one non-edge pixel with the low-pass filter value when the comparison is less than the first threshold and greater than the second threshold.

In various implementations, the method includes defining a first threshold (N), a second threshold (M), and a third threshold (P), wherein $P \leq M \leq N$; and outputting a value for the at least one non-edge pixel based on the comparison of the at least one non-edge pixel to the neighboring pixel region.

These and other objects, along with advantages and features herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. In the following description, various embodiments are described with reference to the following drawings, in which.

DETAILED DESCRIPTION

Figure 1:
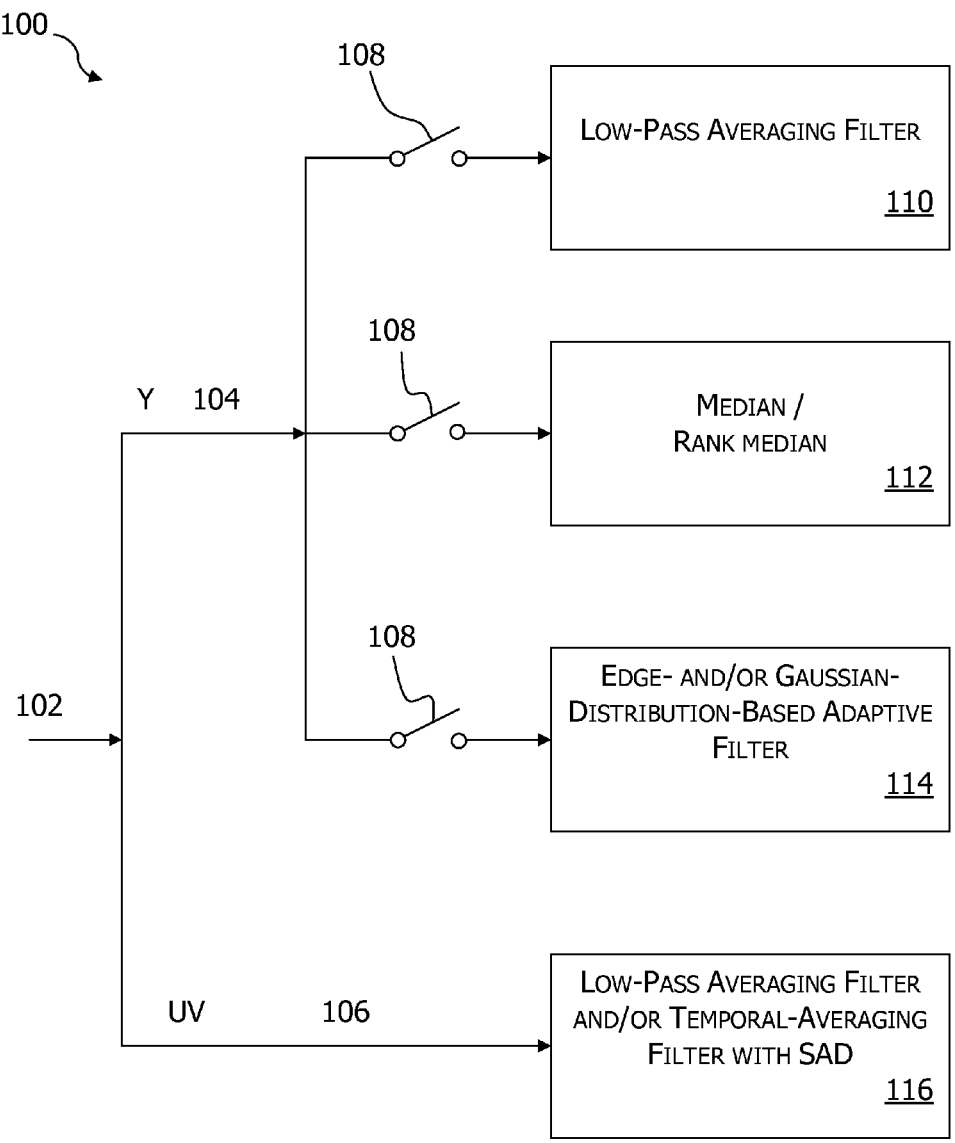
FIG. 1 is a block diagram of a system for removing noise from a low-light image in accordance with an embodiment.

FIG. 1 illustrates a system 100 for removing noise from a low-light image. As one of skill in the art will understand, a source image 102 may be separated into a brightness component 104 and a color component 106. The brightness component 104 may also be known as a Y or luma component; the color component 106 may also be known as a UV or chroma component. In one embodiment, the brightness component 104 and color component 106 are filtered separately using different filters. Once the brightness component 104 and color component 106 are filtered, they may be combined to re-create a filtered version of the original image 102 or further processed as separate components.

A network of switches 108 selects one of three filters 110, 112, 114 for the brightness component 104 of the image 102. The system 100 may include any number of brightness-component filters, however, including a single filter, and the present disclosure is not limited to any particular number or type of filter. In one embodiment, a low-pass averaging filter 110 may be selected by the switches 108 if the source image 102 is simple, if only a small degree of filtering is required, and/or if system resources are limited. The low-pass averaging filter 110 attenuates high-frequency signals in the brightness component 104, while allowing low-frequency signals to pass. In one embodiment, the low-pass averaging filter 110 performs a blur function on the brightness component 104.

A median filter 112 may be used to filter the brightness component 104 for images of medium complexity, if a medium amount of filtering is desired, and/or if an average amount of system resources is available. As one of skill in the art will understand, the median filter 112 processes the brightness component 104 pixel by pixel and replaces each pixel with the median of it and surrounding pixels. For example, the median filter 112 may consider a 3×3 window of pixels surrounding a pixel of interest (i.e., nine total pixels). The median filter 112 sorts the nine pixels by their brightness values, selects the value in the middle (i.e., fifth) position, and replaces the pixel of interest with the selected value. In one embodiment, the filter 112 is a rank or rank-median filter, and may select a pixel in any position in the sorted list of pixels (e.g., the third or sixth position). In one embodiment, if the absolute difference between the selected value and the original value is larger than the threshold, the original value is kept; if the difference is smaller than or equal to the threshold, the ranked value is assigned.

An adaptive filter 114 may be used to filter the brightness component 104 for images of high complexity, if a large amount of filtering is desired, and/or if a large amount of system resources is available. The adaptive filter 114 selects a filtering technique based on the dynamically determined characteristics of the brightness component 104, as explained in greater detail below.

A low-pass averaging filter 116 (e.g., a 5×5 low-pass averaging filter) may be used to filter the color component 106. In one embodiment, the color component 106 is less complex than the brightness component and/or is less affected by low-light noise and thus requires less filtering. The filter 116 may be a temporal-averaging filter with sum-of-absolute-differences or any other type of similar filter. The system 100 may include more than one color-component filter 116, and one of the plurality of color-component filters 116 may be selected based on the complexity of the color component 106, the availability of system resources, and/or a desired level of filtering quality.

Figure 2:
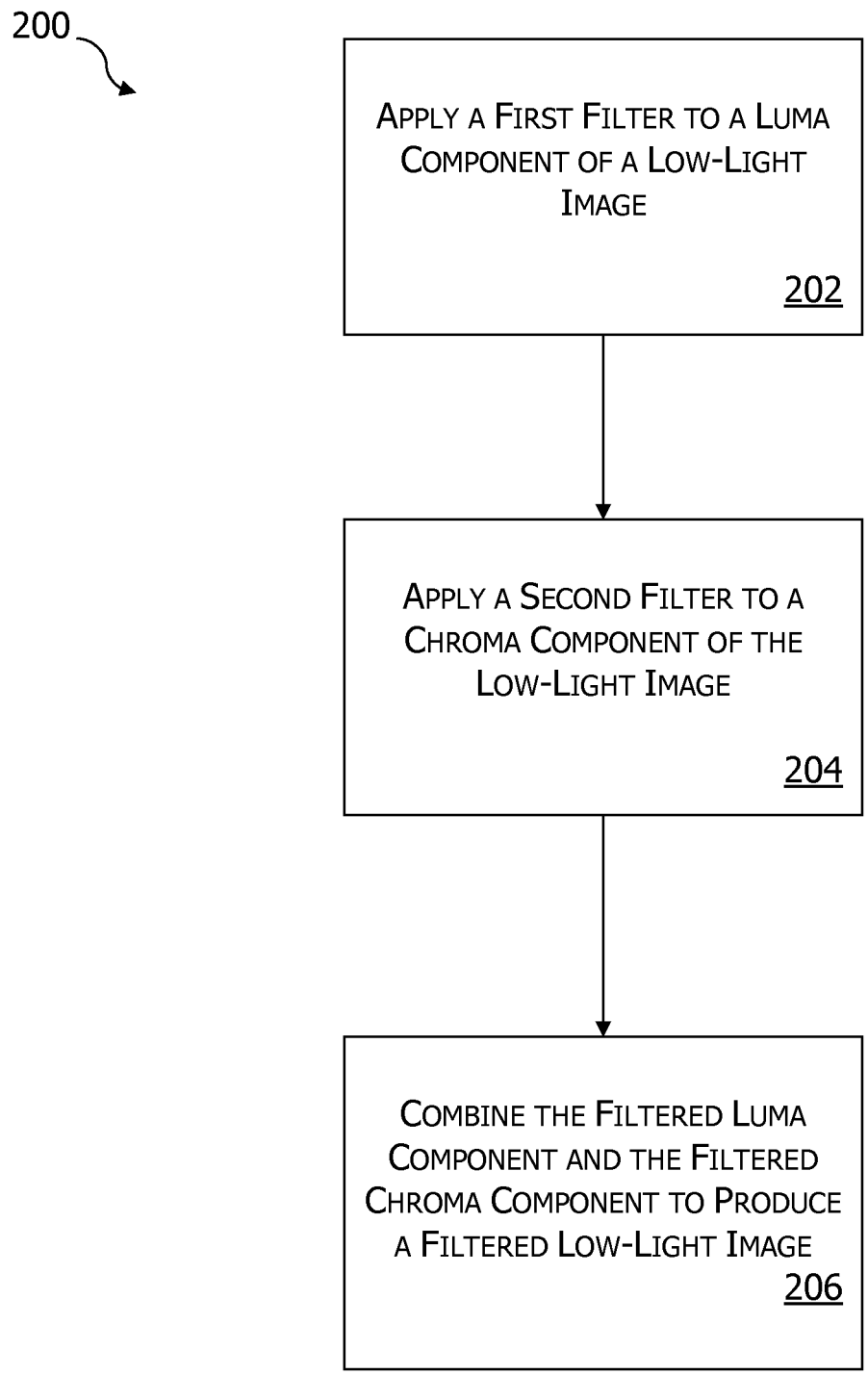
FIG. 2 is a flowchart illustrating a method for removing noise from a low-light image in accordance with an embodiment.

FIG. 2 illustrates a flowchart 200 for removing noise from a low-light image. A first filter is applied to a luma component of a low-light image (Step 202) and a second filter is applied to a chroma component of the low-light image (Step 204). The filtered luma component is combined with the filtered chroma component to produce a filtered low-light image (Step 206). The first filter may be the low-pass averaging filter 110, median/rank-median filter 112, or the edge/Gaussian-distribution-based adaptive filter 114, as described above, and the second filter may be the low-pass or temporal-averaging filter 116.

Figure 3:
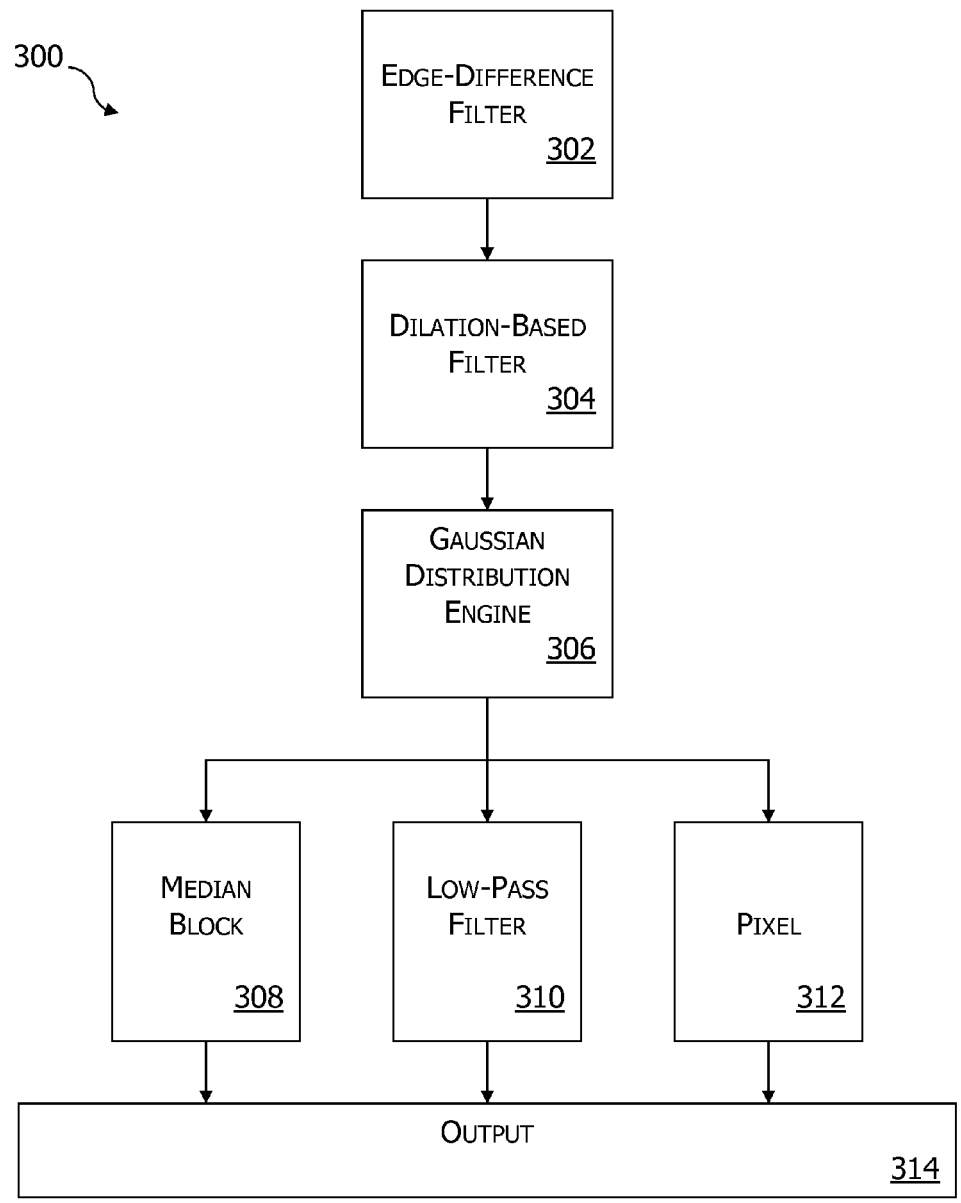
FIG. 3 is a block diagram of an adaptive filter in accordance with an embodiment.

FIG. 3 is an illustration of one implementation 300 of the adaptive filter 114. An edge-difference filter 302 detects edges in a luma component 104 of an image 102. The edge-difference filter 302 may also be known as a difference filter. The edge-difference filter 302 may detect edges in the luma component 104 while retaining high-frequency details therein. The edge-detection process divides the pixels in the luma component into edge and non-edge pixels.

A dilation-based filter 304 modifies the output of the edge-difference filter 302 by distributing the results of the edge detection to neighboring pixels. The dilation-based filter may be modified to ease implementation on, for example, embedded and/or DSP platforms. For example, if four pixels in a row are dilated, the four pixels may be shifted, depending on the pixel location, to align with a word boundary. In various embodiments, the dilation-based filter 304 is a morphology filter, a 3×4 dilation filter, or a 4×3 dilation filter. The dilation-based filter 304 may expand, or dilate, regions of pixels designated as edge pixels to incorporate other, nearby pixels. For example, a pixel having an intensity different from its neighbors may be the result of low-light noise; but, if the location of the pixel is near a detected edge, the pixel may instead be the result of a real physical feature of the captured image. The dilation-based filter 304, by correlating such pixels occurring near detected edges to edge pixels, prevents their erroneous designation as noise-produced pixels.

Each non-edge pixel in the dilated luma component 104 is then analyzed against a neighboring region of pixels (e.g., a neighboring 3×3 block of pixels). Depending on the differences between the analyzed pixel and its neighbors, as computed by a Gaussian distribution engine 306, the pixel is assigned a new value according to assignment units 308-312 and output by an output unit 314.

In greater detail, the Gaussian distribution engine 306 computes a mean and a variance of the Gaussian distribution of the block or window surrounding the analyzed pixel. The deviation of the pixel from the mean of the block is computed and compared with the variance. If the difference between the pixel and the variance is much greater than the mean (e.g., greater than three times the standard deviation), the pixel is likely the result of low-light noise. In this case, the median block 308 replaces the pixel with the median of the block of pixels. If the difference between the pixel and the variance is near the mean, the low-pass filter 310 replaces the analyzed pixel with the result of low-pass filtering the block of pixels. If the difference between the pixel and the variance is less than the mean, the pixel block 312 passes the analyzed pixel to the output block 314 unchanged.

In general, the algorithm utilized by the assignment units 308-312 may be generalized by the following equations:

If {(Analyzed Pixel)−(Mean of Block of Pixels)
}>$N$×(Variance of Block of Pixels):
    Output=Median of Block of Pixels    (1)

If {(Analyzed Pixel)−(Mean of Block of Pixels)
}>$M$×(Variance of Block of Pixels):
    Output=Result of Low-Pass Filter of Block of
    Pixels    (2)

If {(Analyzed Pixel)−(Mean of Block of Pixels)
}>$P$×(Variance of Block of Pixels):
    Output=Original Analyzed Pixel    (3)

wherein $P \leq M \leq N$. That is, the output 314 is assigned the median 308 for large differences, the low-pass filter 310 for medium differences, and the original pixel 312 for small differences. In one embodiment, the operations performed by the above equations (1)-(3) are executed by specially allocated hardware. In another embodiment, the median operation is performed by the median filter 112 and low-pass filtering is performed by the low-pass averaging filter 110, as shown in FIG. 1.

Figure 4:
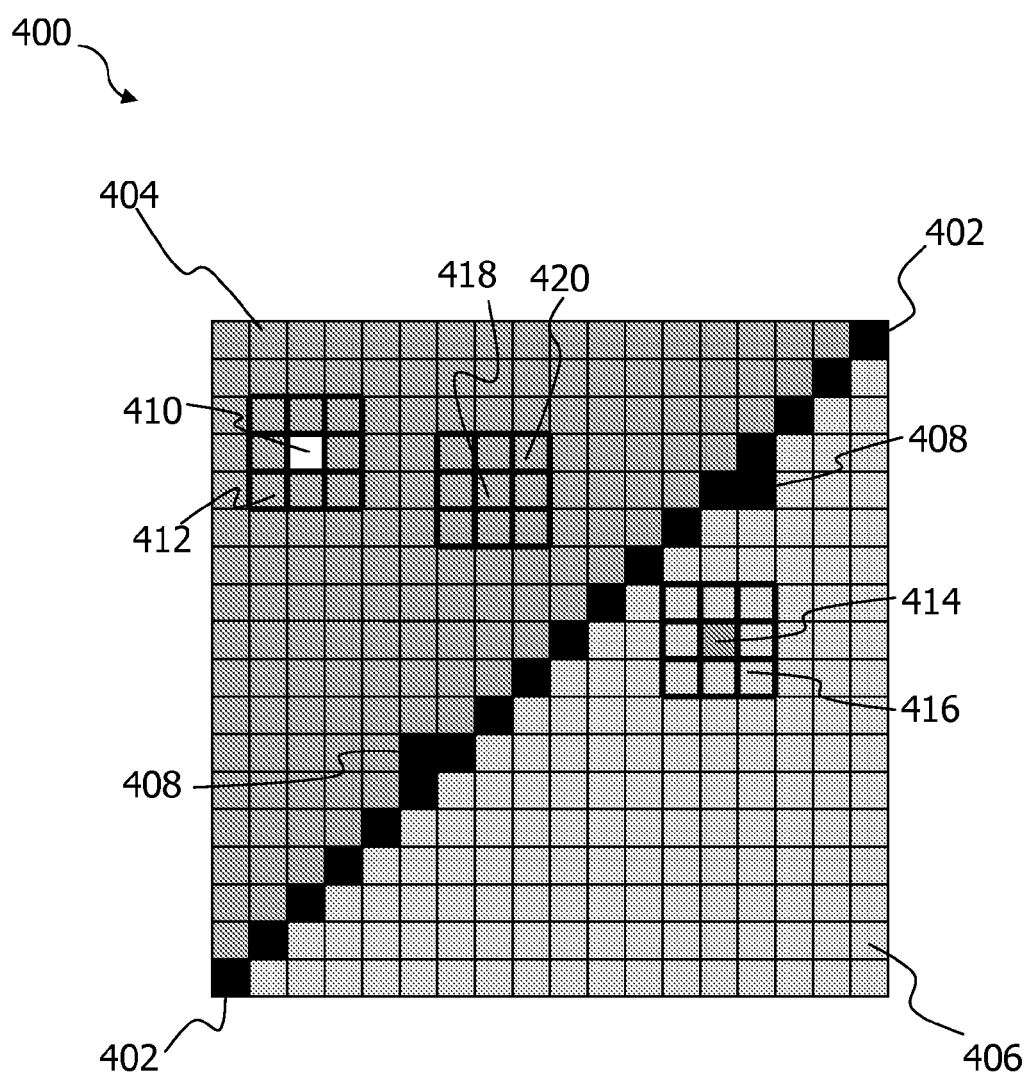
FIG. 4 is an example of a low-light image component in accordance with an embodiment.

FIG. 4 illustrates an example luma component 400. An edge 402 is detected between image regions 404 and 406. As described above, pixels 408 near the edge 402 may be designated as edge pixels by the dilation-based filter 304. A first pixel 410 may be analyzed and compared to its 3×3 surrounding pixels 412. In this case, because the difference between the analyzed pixel 410 and the mean of the block of pixels 412 is much greater (i.e., greater than a threshold N) than the variance of the block of pixels 412 (i.e., there is a large discrepancy between the luma value of the pixel 410 and its neighbors 412), the pixel 410 is replaced with the median of the 3×3 surrounding pixels 412.

In another example, another pixel 414 is analyzed and compared to its surrounding pixels 416. Here, because the difference between the analyzed pixel 414 and the mean of the block of pixels 412 is less than the first threshold N but greater than a second threshold M when compared to the variance of the block of pixels 412, the pixel 414 is replaced with the result of low-pass filtering the block 416. Finally, because the difference between a third analyzed pixel 418 and the mean of its surrounding block of pixels 420 is much less than a threshold P when compared to the variance of the block of pixels 420, the pixel 418 remains unchanged.

In one embodiment, the above-described system 300 analyzes every pixel in the luma component 104. In other embodiments, the system 300 analyzes only a subset of the total pixels in the luma component 104. For example, the system 300 may analyze only even-numbered pixels (e.g., every second pixel) in the luma component 104. The result of analyzing an even-numbered pixel may be applied not only to that pixel itself, but also to a neighboring odd-numbered pixel (e.g., a pixel adjacent to the analyzed even-numbered pixel in the same row). Because the two pixels are neighbors, the result computed for one pixel is likely to be similar to the uncomputed result of the neighboring pixel, and applying the analyzed pixel's result to both pixels may produce only a small error. Other subsets of pixels may be chosen for analysis, such as odd pixels, every Nth pixel, diagonal pixels, or rows/columns of pixels. The analyzed pixels may constitute 50% of the total pixels, as in the example above, or any other percentage of total pixels.

Figure 5:
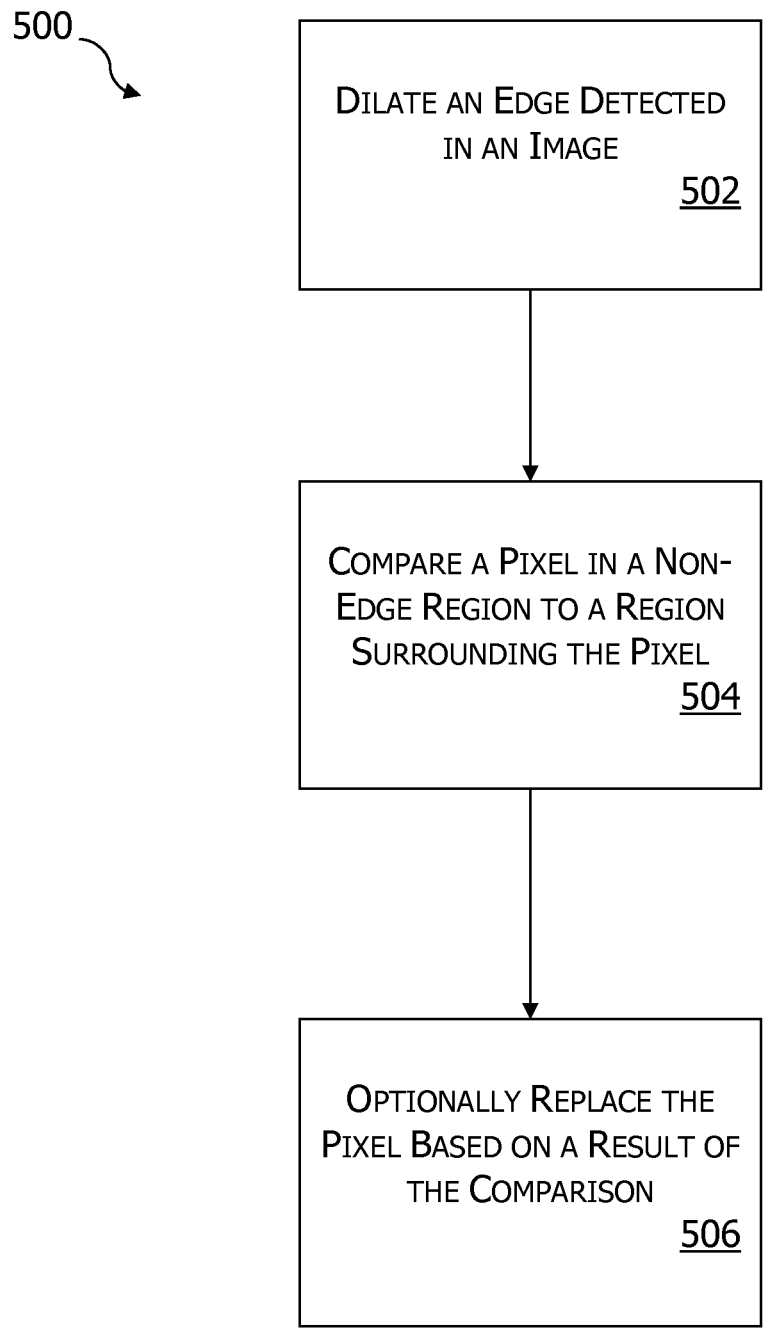
FIG. 5 is a flowchart illustrating a method for adaptively filtering noise from a low-light image in accordance with an embodiment.

FIG. 5 is a flowchart 500 illustrating a method for adaptively filtering noise from a low-light image. An edge detected in the image is dilated (Step 502) using, e.g., the edge-difference filter 302 and dilation-based filter 304 described above. The edge-detection and dilation divides the image into edge and non-edge pixels, and pixels in the non-edge region are compared to regions surrounding the pixels (Step 504). Depending on the result of the comparison, as described above, the non-edge pixels are optionally replaced (Step 506).

Figure 6:
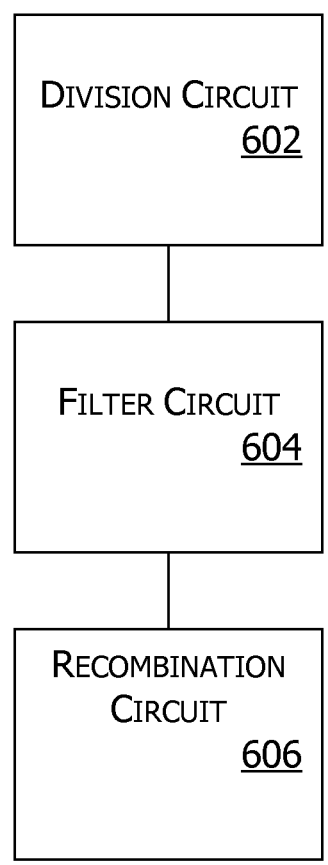
FIG. 6 is a block diagram of a system for dividing an image to remove low-light noise therefrom in accordance with an embodiment.

FIG. 6 is a block diagram 600 of a system for removing noise from a low-light image by dividing the image into sub-regions. A division circuit 602 divides the image into two or more regions, and a filter circuit 604 applies a first filter to luma components of each of the regions. Once each region has been filtered, a recombination circuit 606 combines each filtered region to create a filtered image. In general, the regions may be any M×N size, for example, 16×16 pixels.

In one embodiment, the system 600 may be used to divide an image into a number of regions that corresponds to a number of available filter circuits 604. Each filter circuit 604 may include a system 100, as illustrated in FIG. 1, for removing low-light noise from each region. The filter circuit 604 may include a first filter for filtering a luma component and a second filter for filtering a chroma component. The plurality of regions may then be filtered simultaneously in parallel, thereby reducing the time required to filter the entire image. In other embodiments, the number of regions is greater than the number of filter circuits 604, and some regions are processed in parallel while others are queued.

In another embodiment, only one filter circuit 604 is used to process each image region in series. In this embodiment, the size of the image region may be defined by an amount of memory or other storage space available and/or the capabilities of the filter circuit 604. The size of the region may be adjusted to consume more or fewer resources, depending on the constraints of a particular application. For example, an application having very limited memory may require a small region. History information for rows and columns of the regions or image may be stored and managed to ease data movement when switching and/or combining image regions.

Figure 7:
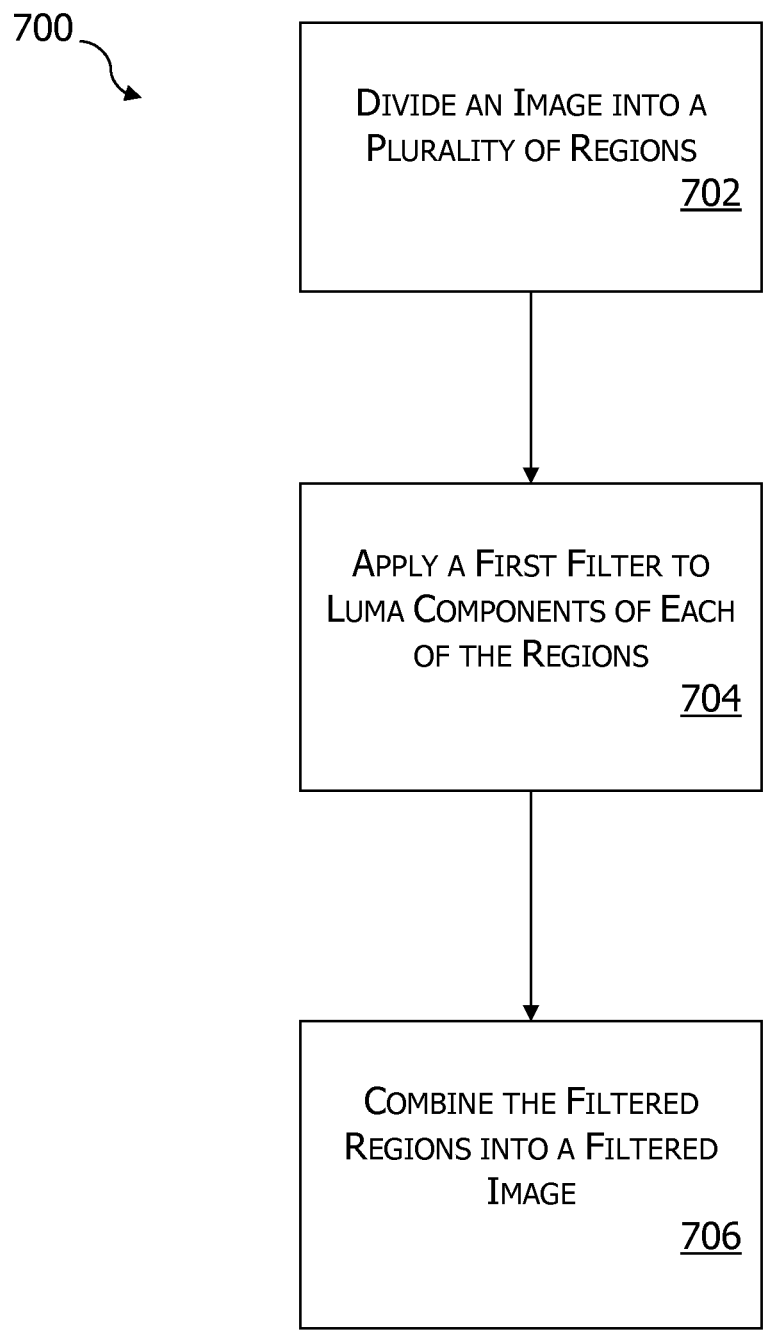
FIG. 7 is a flowchart illustrating a method for dividing an image to remove low-light noise therefrom in accordance with an embodiment.

FIG. 7 illustrates a method 700 for removing noise from a low-light image by dividing the image into sub-regions. The image is divided into a plurality of regions (Step 702), and a first filter is applied (in series or in parallel) to luma components of each of the regions (Step 704). The separately filtered regions are combined into a filtered image (Step 706).

Applying the first filter may include low-pass filtering the region, median filtering the region, and/or adaptively filtering the region, as described above with reference to FIG. 1. The adaptive filter compares a pixel in the region to neighboring pixels and optionally replaces it. As also described above, a chroma component of the image may also be broken down into image regions by the division circuit 602, filtered with a second filter, and re-combined by the recombination circuit 606. The sizes of the image regions of the chroma component may be the same as or different from the sizes of the image regions of the luma component. In one embodiment, the chroma component is processed as an entire image, due to its having less complexity, while the luma component is divided and processed separately.

Embodiments disclosed herein may be provided as hardware, software, and/or firmware. For example, the systems 100, 300, 600 may be implemented on an embedded device, such as an ASIC, FPGA, microcontroller, or other similar device, and included in a video or still camera. In other embodiments, elements of the systems 100, 300, 600 may be implemented in software and included on a desktop, notebook, netbook, or handheld computer. In these embodiments, a webcam, cellular-phone camera, or other similar device may capture images or video, and the systems 100, 300, 600 may remove low-light noise therefrom. The embodiment disclosed herein may further be provided as one or more computer-readable programs embodied on or in one or more articles of manufacture. The article of manufacture may be any suitable hardware apparatus, such as, for example, a floppy disk, a hard disk, a CD ROM disk, DVD ROM disk, a Blu-Ray disk, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments were described above. It is, however, expressly noted that the present disclosure is not limited to those embodiments, but rather the intention is that additions and modifications to what was expressly described herein are also included within the scope of the present disclosure. Moreover, it is to be understood that the features of the various embodiments described herein were not mutually exclusive and can exist in various combinations and permutations, even if such combinations or permutations were not made express herein, without departing from the spirit and scope of the present disclosure. In fact, variations, modifications, and other implementations of what was described herein will occur to those of ordinary skill in the art without departing from the spirit and the scope of the present disclosure. As such, the present disclosure is not to be defined only by the preceding illustrative description.

What is claimed is:

1. A system for removing noise from an image, the system comprising:
an edge-detection-based adaptive filter configured to:
identify edge pixels and non-edge pixels in the image,
select a filtering technique for at least one non-edge pixel, out of a plurality of filtering techniques for non-edge pixels, based on whether a comparison of the at least one non-edge pixel to a neighboring pixel region indicates that the at least one non-edge pixel is a result of low-light noise, and
generate a transformed image by applying the selected filtering technique to the image.

2. The system of claim 1, wherein the edge-detection-based adaptive filter includes an edge-difference filter configured to divide pixels of the image into the edge pixels and the non-edge pixels.

3. The system of claim 1, wherein the edge-detection-based adaptive filter includes a dilation-based filter configured to expand a region of edge pixels to include non-edge pixels.

4. The system of claim 1, further comprising a Gaussian distribution engine configured to compute a mean and a variance of the Gaussian distribution of the neighboring pixel region.

5. The system of claim 4, wherein the Gaussian distribution engine is further configured to compare the at least one non-edge pixel to the neighboring pixel region by:
determining a difference between a value of the at least one non-edge pixel and the mean of the neighboring pixel region; and
selecting the filtering technique based on a comparison of the difference and the variance of the neighboring pixel region.

6. The system of claim 1, wherein an outcome of the comparison is a numerical value indicating a likelihood of the at least one non-edge pixel being the result of low-light noise, the system further comprising:
a median-filter configured to determine a median value for the neighboring pixel region,
wherein applying the selected filtering technique to the image comprises replacing an original value of the at least one non-edge pixel with the median value when the outcome of the comparison is greater than a first threshold.

7. The system of claim 6, further comprising:
a low-pass filter configured to determine a low-pass filter value for the neighboring pixel region,
wherein applying the selected filtering technique to the image comprises replacing the original value of the at least one non-edge pixel with the low-pass filter value when the outcome of the comparison is less than the first threshold and greater than a second threshold.

8. The system of claim 7, wherein the edge-detection-based adaptive filter is configured to output the low-pass filter value, the median value, or the original value.

9. The system of claim 2, wherein the edge-detection-based adaptive filter includes a dilation-based filter configured to modify an output of the edge-difference filter by distributing results of edge detection to neighboring pixels.

10. A method for removing noise from an image, the method comprising:
identifying edge pixels and non-edge pixels in the image;
selecting a filtering technique for at least one non-edge pixel, out of a plurality of filtering techniques for non-edge pixels, based on whether a comparison of the at least one non-edge pixel to a neighboring pixel region indicates that the at least one non-edge pixel is a result of low-light noise; and
generating a transformed image by applying the selected filtering technique to the image.

11. The method of claim 10, wherein the identifying the edge pixels and non-edge pixels includes expanding a region of edge pixels to include non-edge pixels.

12. The method of claim 10, wherein the selecting the filtering technique for the at least one non-edge pixel based on the comparison of the at least one non-edge pixel to the neighboring pixel region includes:
  determining a mean of the neighboring pixel region;
  determining a variance of the neighboring pixel region;
  determining a difference between an original value of the at least one non-edge pixel and the mean of the neighboring pixel region; and
  determining an assigned value of the at least one non-edge pixel based on a comparison of the difference and the variance of the neighboring pixel region.

13. The method of claim 12, wherein an outcome of the comparison is a numerical value indicating a likelihood of the at least one non-edge pixel being the result of low-light noise and wherein the determining the assigned value of the at least one non-edge pixel includes:
  when the outcome of the comparison is greater than a first threshold, determining a median value for the neighboring pixel region and assigning the at least one non-edge pixel with the median value;
  when the outcome of the comparison is less than the first threshold and greater than a second threshold, determining a low-pass filter value for the neighboring pixel region and assigning the at least one non-edge pixel with the low-pass filter value; and
  when the outcome of the comparison is less than the second threshold, assigning the at least one non-edge pixel the original value.

14. The method of claim 12, wherein the determining the mean and the variance includes determining a mean and a variance of a Gaussian distribution of the neighboring pixel region.

15. The method of claim 10, further comprising:
  defining a first threshold (N), a second threshold (M), and a third threshold (P), wherein P≤M≤N; and
  outputting a value for the at least one non-edge pixel based on the comparison of the at least one non-edge pixel to the neighboring pixel region.

16. The method of claim 12, wherein an outcome of the comparison is a numerical value indicating a likelihood of the at least one non-edge pixel being the result of low-light noise and wherein the method further comprises:
  determining a median value for the neighboring pixel region and replacing the at least one non-edge pixel with the median value when the outcome of the comparison is greater than the first threshold.

17. The method of claim 10, wherein the neighboring pixel region is a neighboring 3×3 block of pixels.

18. A non-transitory media that includes a program for execution to remove noise from an image and, when executed by a processor, operable to perform operations comprising:
  identifying edge pixels and non-edge pixels in the image;
  selecting a filtering technique for at least one non-edge pixel, out of a plurality of filtering techniques for non-edge pixels, based on whether a comparison of the at least one non-edge pixel to a neighboring pixel region indicates that the at least one non-edge pixel is a result of low-light noise, and
  generating a transformed image by applying the selected filtering technique to the image.

19. The non-transitory media of claim 18, wherein the selecting the filtering technique for the at least one non-edge pixel based on the comparison of the at least one non-edge pixel to the neighboring pixel region includes:
  determining a mean of the neighboring pixel region;
  determining a variance of the neighboring pixel region;
  determining a difference between an original value of the at least one non-edge pixel and the mean of the neighboring pixel region; and
  determining an assigned value of the at least one non-edge pixel based on a comparison of the difference and the variance of the neighboring pixel region.

20. The non-transitory media of claim 19, wherein an outcome of the comparison is a numerical value indicating a likelihood of the at least one non-edge pixel being the result of low-light noise and wherein the determining the assigned value of the at least one non-edge pixel includes:
  when the outcome of the comparison is greater than a first threshold, determining a median value for the neighboring pixel region and assigning the at least one non-edge pixel with the median value;
  when the outcome of the comparison is less than the first threshold and greater than a second threshold, determining a low-pass filter value for the neighboring pixel region and assigning the at least one non-edge pixel with the low-pass filter value; and
  when the outcome of the comparison is less than the second threshold, assigning the at least one non-edge pixel the original value.

21. The method of claim 16, further comprising:
  determining a low-pass filter value for the neighboring pixel region and replacing the at least one non-edge pixel with the low-pass filter value when the outcome of the comparison is less than the first threshold and greater than the second threshold.

22. The non-transitory media of claim 18, wherein an outcome of the comparison is a numerical value indicating a likelihood of the at least one non-edge pixel being the result of low-light noise and wherein the operations further comprise:
  determining a median value for the neighboring pixel region and replacing the at least one non-edge pixel with the median value when the outcome of the comparison is greater than the first threshold; and
  determining a low-pass filter value for the neighboring pixel region and replacing the at least one non-edge pixel with the low-pass filter value when the outcome of the comparison is less than the first threshold and greater than the second threshold.

* * * * *